United States Patent [19]

Login et al.

[11] Patent Number: 5,206,322

[45] Date of Patent: Apr. 27, 1993

[54] CROSSLINKABLE, FUNCTIONAL POLYMERS OF VINYLPYRROLIDONE AND AMINOALKYL ACRYLAMIDES

[75] Inventors: Robert B. Login, Oakland; Jenn S. Shih, Paramus; Jui-Chang Chuang, Wayne, all of N.J.

[73] Assignee: ISP Investments Inc., Wilmington, Del.

[21] Appl. No.: 888,998

[22] Filed: May 26, 1992

[51] Int. Cl.$^5$ .............................................. C08F 26/10
[52] U.S. Cl. ................................... 526/264; 525/326.9
[58] Field of Search ....................... 526/264; 525/326.9

[56] References Cited

U.S. PATENT DOCUMENTS

| | | | |
|---|---|---|---|
| 2,980,657 | 4/1961 | Melamed | 526/264 |
| 3,178,397 | 4/1965 | Olaj et al. | 526/264 |
| 3,563,968 | 2/1971 | Merijan et al. | 524/765 |
| 4,692,328 | 9/1987 | Kitchell et al. | 524/548 |
| 4,772,484 | 9/1988 | Kitchell et al. | 524/548 |
| 5,045,617 | 9/1991 | Shih et al. | 525/326.9 |

Primary Examiner—Joseph L. Schofer
Assistant Examiner—Alex H. Walker
Attorney, Agent, or Firm—Walter Katz; Marilyn J. Maue; Joshua J. Ward

[57] ABSTRACT

Crosslinkable, functional polymers of vinylpyrrolidone and aminoalkyl acrylamides are provided herein. Such polymers are readily crosslinked with a crosslinking agent, e.g. a multi-aldehyde, such as a di-, tri- or tetra-aldehyde, preferably, glutaric dialdehyde, to form an aqueous gel of predetermined viscosity suitable for making hydrogels, adhesives and coatings.

2 Claims, No Drawings

CROSSLINKABLE, FUNCTIONAL POLYMERS OF VINYLPYRROLIDONE AND AMINOALKYL ACRYLAMIDES

BACKGROUND OF THE INVENTION

1. Field of the Invention

This invention relates to functional polymers of vinylpyrrolidone, and, more particularly, to such polymers which can be readily crosslinked to provide aqueous gels of such crosslinked polymers.

2. Description of the Prior Art

Merijan, in U.S. Pat. No. 3,563,968, described the preparation of functional homopolymers of vinylpyrrolidone by reaction of the monomer with allylamine and allylalcohol in ethanol solvent in a bomb reactor at 130°–140° C.

Kitchell, in U.S. Pat. Nos. 4,692,328 and 4,772,484, disclosed the crosslinking of functional polymers of vinylpyrrolidone and allylamine with glutaraldehyde to form an aqueous gel suitable for use as coatings in biological applications.

Other pertinent references in this field include U.S. Pat. Nos. 4,699,146 and 4,750,482.

DETAILED DESCRIPTION OF THE INVENTION

What is provided herein are crosslinkable, functional polymers of vinylpyrrolidone (VP) and aminoalkyl acrylamides (AAAM) which can be readily crosslinked with glutaric dialdehyde to form an aqueous gel of predetermined viscosity suitable for making hydrogels, adhesives and coatings.

In the preferred embodiment of the invention, AAAM is N-(3-aminopropyl)methacrylamide (APMAM), in an amount which provides a crosslinkable, functional polymer in the compositional ratio of about 90–99.7% VP to about 0.3–10% APMAM. These polymers can be crosslinked with a crosslinking agent, e.g. a di-, tri-, or tetra- aldehyde, glutaric dialdehyde, in aqueous solution, e.g. a 5% solution, to form crosslinked polymers of VP/APMAM having a viscosity of about 100,000 to 300,000 cps.

The VP/APMAM polymers preferably are prepared by solution polymerization of the monomers in water, and the crosslinked polymers were made by reaction between an aqueous solution of the polymer and glutaric dialdehyde.

EXAMPLES 1–5

Preparation of VP/APMAM Polymers

In a 1-liter, 4-necked reaction kettle equipped with a condenser, a mechanical stirrer, a dropping funnel, a nitrogen purge adaptor, and a thermocouple connected to the temperature controller, 500 g. of deionized water and a predetermined amount of vinylpyrrolidone (see Table 1 below) were charged. The reactor was heated to 65° C. in 30 minutes with nitrogen purge throughout the entire process. The reactor temperature was held at 65° C. for another 30 minutes. The desired amount of N-(3-aminopropyl)methacrylamide hydrochloride (APMAM-HCl) (Eastman-Kodak) was dissolved in 10 g. of deionized water and the solution was adjusted to pH 8 by adding ammonium hydroxide solution. Then 520 microliters of t-butylperoxypivalate (Lupersol 11) was added and the APMAM solution was fed into reactor over one hour. After the addition, the reaction temperature was increased to 80° C. during 30 minutes and the temperature was held for another 30 minutes. the reactor was cooled to room temperature and the contents were poured into a shallow pan. The polymer produced was freeze-dried overnight and dried in a vacuum oven at 90° C. The results are shown in Tables 1 and 2 below.

TABLE 1

| Ex. No. | Reaction Mixture | | |
|---|---|---|---|
| | VP (g) | APMAM-HCl (g) | APMAM (g) |
| 1 | 90 | 10 | 8.0 |
| 2 | 98 | 2 | 1.6 |
| 3 | 99 | 1 | 0.8 |
| 4 | 99.5 | 0.5 | 0.4 |
| 5 | 99.75 | 0.25 | 0.2 |

TABLE 2

| Ex. No. | Physical Properties of the Polymer | | |
|---|---|---|---|
| | VP/APMAM | K-Value | Resid. VP (%) |
| 3 | 99/0.8 | 79 | 0.35 |
| 4 | 99.5/0.4 | 84.7 | 0.04 |
| 5 | 99.75/0.2 | 70.1 | 0.31 |

EXAMPLE 6

Preparation of Crosslinked VP/APMAM Polymers

Predetermined compositions of the VP/APMAM functional polymers produced above were reacted as a 5% solution in water with a 50% aqueous solution of glutaric dialdehyde to produce a crosslinked polymer in the form of an aqueous gel whose viscosity was a function of the composition of the crosslinked polymer. The results are shown in Table 3 below.

TABLE 3

| Ex. No. | Viscosity Properties of the Crosslinked Polymer (5%) | |
|---|---|---|
| | Brookfield Viscosity (cps) | |
| | Uncrosslinked Polymer | Crosslinked Polymer |
| 3 | 77 | 200,000 |
| 4 | 112 | 120,000 |
| 5 | 60 | 60 |

The crosslinked, functional polymers of the invention find particular use in the form of hydrogels, adhesives and coatings, in oil recovery, thickener, controlled release, wound dressings and electroconducting contact applications.

While the invention has been described with particular reference to certain embodiments thereof, it will be understood that changes and modifications may be made which are within the skill of the art. Accordingly, it is intended to be bound only by the following claims, in which:

What is claimed is:

1. A crosslinkable, functional polymer which is obtained by polymerizing vinylpyrrolidone and N-(3-aminopropyl)methacrylamide.

2. A crosslinkable, functional polymer which is obtained by polymerizing about 90–99.7% by weight of vinylpyrrolidone and about 0.3–10% by weight of N-(3-aminopropyl)methacrylamide.

* * * * *